T. SMITH.
VALVE.
APPLICATION FILED APR. 10, 1911.
1,023,177.   Patented Apr. 16, 1912.
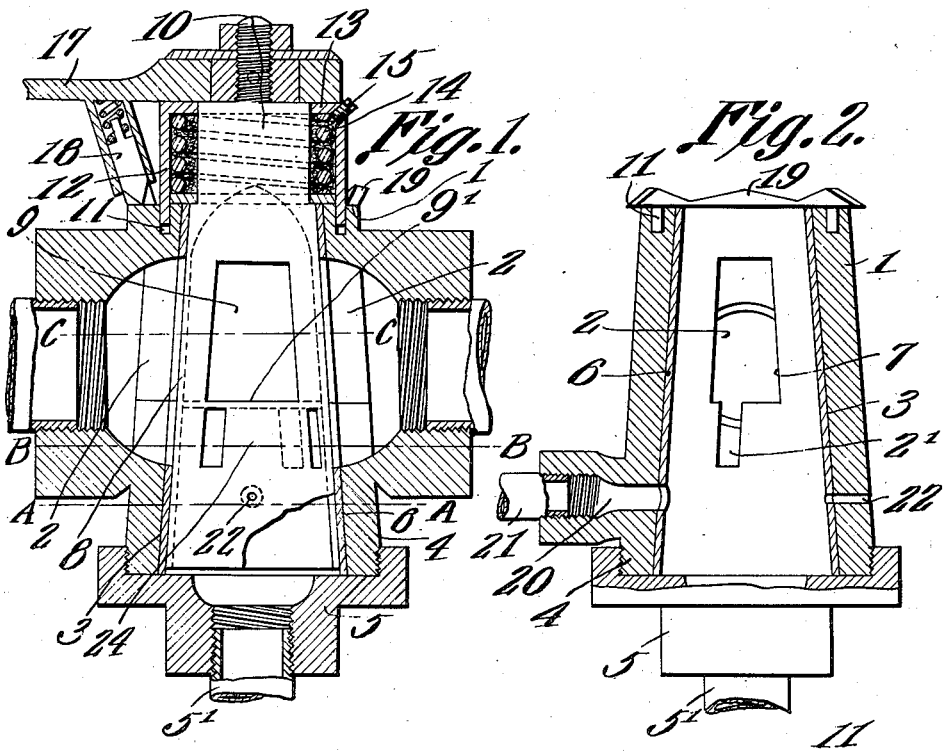
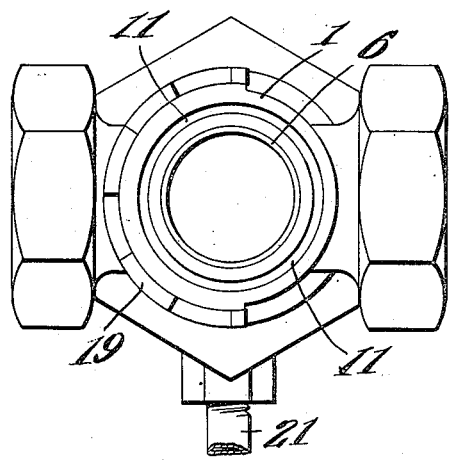
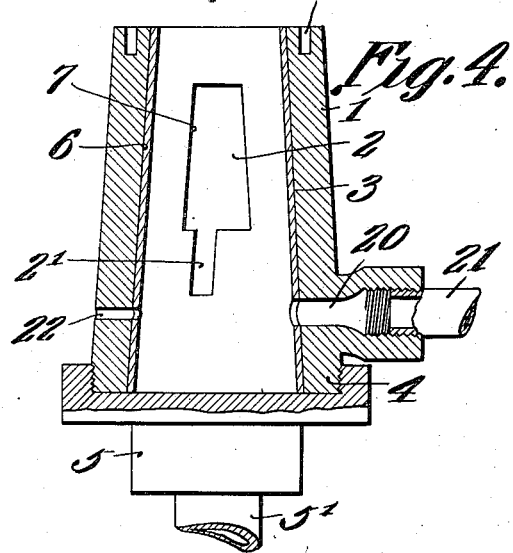
Witnesses
Thomas Smith,
Inventor
by C. A. Snow & Co.
Attorneys

UNITED STATES PATENT OFFICE.

THOMAS SMITH, OF SAN LUIS POTOSI, MEXICO, ASSIGNOR OF ONE-HALF TO GEORGE T. SHARPTON, OF SAN LUIS POTOSI, MEXICO.

VALVE.

1,023,177.  Specification of Letters Patent.  Patented Apr. 16, 1912.

Application filed April 10, 1911. Serial No. 620,041.

*To all whom it may concern:*

Be it known that I, THOMAS SMITH, a citizen of the United States, residing at San Luis Potosi, in the State of San Luis Potosi and Republic of Mexico, have invented a new and useful Valve, of which the following is a specification.

This invention relates to valves and consists in the novel construction and arrangement of its parts as hereinafter described and claimed.

While the general structure of the valve hereinafter described may be used in various directions, the valve as is described is especially adapted to be used upon train pipes in air-brake systems for connecting the triple valve with the said pipe. The valve now generally used in this connection is objectionable for the reason that when it is necessary to cut out a car on account of a triple valve getting out of order, the operator reaches under the car to close the valve. It is necessary for him to bear his weight upon the valve to move the same sufficiently from its seat in order that it may be turned and closed. This movement of the valve frequently allows grit to become lodged between the valve and seat thereby allowing the air or other fluid to leak through the valve and operate the emergency brake and thereby frequently jerk the train in two by pulling out the draw-head. In order to avoid this and give better service it is the object of this invention to provide a valve that may be oiled at intervals and which is so constructed as to prevent the possibility of permitting the air to leak when the triple valve is cut out.

In brief, the valve consists of a body which may or may not be provided with a lining. A conical seat is provided in the body for a conical valve head which is carried by a stem that projects above the body. A sleeve is mounted upon the projecting end portion of the valve stem and has its lower edge portion seated in a groove provided upon the upper side of the body. A spring is interposed between the upper ends of said sleeve and the top of the body and is under tension with a tendency to hold the valve head in close contact with the conical seat provided within the body. Any suitable means in the form of a handle mechanism may be provided for the stem whereby the head may be turned within the body.

In the accompanying drawings,—Figure 1 is a vertical sectional view of the valve. Fig. 2 is a vertical sectional view of the valve body. Fig. 3 is a top plan view of the valve body. Fig. 4 is a vertical sectional view of the valve body viewing the same at the opposite sides of that illustrated in Fig. 2.

The valve consists of a body 1 having ports 2 which connect with the train pipe (not shown). The body 1 is provided with a conical bore 3 which penetrates the top and bottom sides of said body. The body 1 is provided at its lower side with a boss 4 through which the lower enlarged portion of the bore 3 passes. A coupling 5 is screw-threaded upon the boss 4 and is adapted to be connected with the pipe 5' leading to the valve. The valve body 1 is preferably provided with a lining 6 which is provided in its side with openings 7 which register with the ports 2 of the body 1. The lining 6 is also conical in shape and fits snugly within the bore 3 of the body 1 and extends from the upper surface of the top of the body to the lower surface of the boss 4 provided at the bottom of the body 1. The lower end of the lining 6 fits against the upper surface of the intermediate portion of the coupling 5. A valve head 8 is snugly received within the lining 6 and the said head is hollow but is provided with lateral openings 9 which may be brought into register with the openings 7 in the lining 6. Also the head is provided below the openings 9 with a partition 9' which divides the interior of the head into upper and lower compartments. The lower end of the head 8 is spaced slightly from the upper intermediate surface of the coupling 5 and the said head 8 is provided at its upper end with a circular stem 10 which projects above the upper side of the valve body 1. The head 8 is conical in form and therefore will fit in close contact against the inner surface of the lining 6.

The body 1 is provided at its upper side with an annular groove 11 which is concentrically arranged with relation to the bore 3 and the lower end portion of a sleeve 12 fits snugly in said groove 11. The sleeve 12 is provided at its upper end with an inturned flange 13 which extends to the stem 10 of the valve head 8 thus forming a cup-shaped member having its edge fitting in the groove 11, the circular stem projecting through the said cup-shaped member. A coiled spring 14 is interposed between the upper surface of the top of the valve body 1 and the lower surface of the flange 13 and is under tension with a tendency to hold the sleeve 12 or cup-shaped member in an elevated position. The sleeve 12 is provided at its upper end portion with an oil duct which is normally closed by a screw 15 and through which oil may be passed into the space between the said sleeve and the periphery of the valve stem 10. The said space also contains a loose packing preferably of hair or similar material for the purpose of constituting a body for retaining and controlling the passage of the oil through the sleeve. The lining 6 is held in a fixed position with relation to the bore 3 of the body 1 by suitable means. A handle 17 is fixed to the upper end of the stem 10 and is provided with a spring actuated pawl 18 which is adapted to engage teeth 19 or enter spaces between said teeth located at the top of the valve body 1. The valve body 1 is also provided with a port 20 which is connected with a pipe 21 leading to the brake cylinder (not shown). The body 1 is also provided with an exhaust outlet 22. The head 8 is provided in its lower compartment with openings adapted to register at times with the openings 20 and 22 and at other times are out of register with the said ports which operation need not be described in detail. The major portions of the ports 2 in the sides of the body 1 are above the partition 9' in the head 8 although the said openings 2 are provided with extensions 2' which extend down below the partition 9' and at times register with openings 24 provided in the head 8 below the said partition.

It will be seen that by turning the handle 17 the stem 10 together with the valve head 8 may be rotated within the body 1 or the lining 6 if such is provided and at the same time the lubricant contained within the sleeve 12 in the packing 6 will feed down between the surfaces of the valve head 8 and the bore 3 or the lining 6, and reduce friction between the said parts. If at any time a particle of grit should lodge between the exterior of the valve head and the bore 3 or the lining 6, the said particle may be dislodged by tapping upon the upper end of the stem 10 whereby the valve head 8 will be moved longitudinally within the bore 3 or the lining 6 and thus the said particle may be dislodged from between the parts. As soon as the particle is dislodged as indicated, the tension of the spring 14 comes into play and lifts the valve head 8 back into close contact with the surface of the bore 3 or the interior of the lining 6 if such is used the said spring forcing the cup-shaped member against the handle 17.

It will be noted that the circular stem in passing through the cup-shaped member permits the cup-shaped member to remain stationary relative to the body while the valve head is rotated, and upon the handle being depressed the packing in the cup-shaped member is compressed thereby tending to squeeze the lubricant therefrom to cause same to flow into conical bore. The cup-shaped member being mounted on the circular stem 10 obviates the necessity for the said cup-shaped member to be rotated upon the valve head being rotated, thus permitting the edge of the cup-shaped member to reciprocate in the annular recess 11 and eliminating the wear accruing to rotating motion and also forming a better joint to retain the lubricant within the cup-shaped member.

Having described the invention what I claim as new and desire to secure by Letters Patent is:—

In a valve, a body having a conical bore extending therethrough and having an annular groove in its side adjacent the smaller end of the said bore and concentric with the bore, a cup-shaped member having its edge fitting snugly in the said groove, a conical head disposed within the bore having a circular stem projecting from one end thereof through the cup-shaped member, a coiled spring interposed between the cup-shaped member and the valve body, packing disposed within the cup-shaped member, said cup-shaped member being provided with an oil duct, a screw normally closing the said duct, and a handle fixed to the end of the stem, the cup-shaped member being forced against the said handle by the said spring.

In testimony that I claim the foregoing as my own, I have hereto affixed my signature in the presence of two witnesses.

THOMAS SMITH.

Witnesses:
THOMAS HENRY CHEVHALLO,
THOMAS DICKINSON.